(12) United States Patent
Xiu et al.

(10) Patent No.: US 12,470,733 B2
(45) Date of Patent: Nov. 11, 2025

(54) OVERLAPPED BLOCK MOTION COMPENSATION FOR INTER PREDICTION

(71) Applicant: BEIJING DAJIA INTERNET INFORMATION TECHNOLOGY CO., LTD., Beijing (CN)

(72) Inventors: Xiaoyu Xiu, San Diego, CA (US); Che-Wei Kuo, Beijing (CN); Wei Chen, San Diego, CA (US); Yi-Wen Chen, San Diego, CA (US); Hong-Jheng Jhu, San Diego, CA (US); Xianglin Wang, San Diego, CA (US); Bing Yu, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 93 days.

(21) Appl. No.: 18/474,477

(22) Filed: Sep. 26, 2023

(65) Prior Publication Data

US 2024/0015316 A1    Jan. 11, 2024

Related U.S. Application Data

(63) Continuation of application No. PCT/US2022/022384, filed on Mar. 29, 2022.

(60) Provisional application No. 63/167,619, filed on Mar. 29, 2021.

(51) Int. Cl.
    *H04N 19/44*            (2014.01)
    *H04N 19/176*          (2014.01)

(52) U.S. Cl.
    CPC ........... *H04N 19/44* (2014.11); *H04N 19/176* (2014.11)

(58) Field of Classification Search
    CPC .... H04N 19/44; H04N 19/176; H04N 19/119; H04N 19/54; H04N 19/583
    USPC .......................................................... 375/240
    See application file for complete search history.

(56) References Cited

U.S. PATENT DOCUMENTS

| | | | |
|---|---|---|---|
| 2016/0219302 A1 | 7/2016 | Liu et al. | |
| 2018/0192072 A1* | 7/2018 | Chen | H04N 19/159 |
| 2019/0313095 A1 | 10/2019 | Ikeda | |
| 2019/0364295 A1* | 11/2019 | Li | H04N 19/176 |

(Continued)

FOREIGN PATENT DOCUMENTS

| | | |
|---|---|---|
| JP | 2021016018 A | 2/2021 |
| KR | 20210002674 A | 1/2021 |

OTHER PUBLICATIONS

Extended European Search Report issued in EP Patent Application No. 22782040.4 (mailed Jan. 21, 2025).

(Continued)

*Primary Examiner* — Jamie J Atala
(74) *Attorney, Agent, or Firm* — Myers Bigel, P.A.

(57) ABSTRACT

A method for video decoding is provided. The method includes obtaining a plurality of sub-blocks within an affine coding unit (CU) of a video frame, where the plurality of sub-blocks include a plurality of boundary sub-blocks and a plurality of non-boundary sub-blocks. Further, the method may include applying both overlapped block motion compensation (OBMC) and affine secondary prediction (ASP) to at least one sub-block to generate a sub-block-based prediction for the affine CU or enabling the ASP for the plurality of non-boundary sub-block and disabling the OBMC for the plurality of non-boundary sub-blocks.

18 Claims, 12 Drawing Sheets

(56) References Cited

U.S. PATENT DOCUMENTS

| | | | | |
|---|---|---|---|---|
| 2019/0387251 A1* | 12/2019 | Lin | .................... | H04N 19/105 |
| 2021/0021813 A1* | 1/2021 | Lee | .................... | H04N 19/137 |
| 2021/0084324 A1 | 3/2021 | Ray et al. | | |
| 2021/0392336 A1* | 12/2021 | Tamse | ................. | H04N 19/159 |
| 2022/0201282 A1* | 6/2022 | Chang | ................. | H04N 19/105 |
| 2023/0396780 A1* | 12/2023 | Wang | .................... | H04N 19/70 |

OTHER PUBLICATIONS

Chen et al., "Algorithm description for Versatile Video Coding and Test Model 2 (VTM 2)", Joint Video Experts Team (JVET) of ITU-T SG 16 WP 3 and ISO/IEC JTC 1/SC 29/WG 11, Jul. 2018.
Chen et al., "Algorithm description of Joint Exploration Test Model 3 (JEM3)", Joint Video Exploration Team (JVET) of ITU-T SG 16 WP 3 and ISO/IEC JTC 1/SC 29/WG 11, Jun. 2016.
Lin et al., "CE10.2.1: OBMC", Joint Video Exports Team (JVET) of ITU-T SG 16 WP 3 and ISO/IEC JTC 1/SC 29/WG 11, Oct. 2018.
Sjöberg et al., "Description of SDR and HDR video coding technology proposal by Ericsson and Nokia", Joint Video Exploration Team (JVET) of ITU-T SG 16 WP 3 and ISO/IEC JTC 1/SC 29/WG 11, Apr. 2018.
Zhao et al., "On Affine Motion Vectors", Joint Video Exploration Team (JVET) of ITU-T SG 16 WP 3 and ISO/IEC JTC 1/SC 29/WG 11, Oct. 2016.

* cited by examiner

Motion information of four spatial neighbors are used for the OBMC of A

Sub-blocks with OBMC

Sub-blocks with ASP

```
┌─────────────────────────────────────────────────────────────┐
│ Obtain a plurality of sub-blocks within an affine CU of a video │
│ frame                                                           │
│                                                          1501   │
└─────────────────────────────────────────────────────────────┘
                              │
                              ▼
┌─────────────────────────────────────────────────────────────┐
│ Apply both OBMC and ASP to at least one sub-block to            │
│ generate a sub-block-based prediction for the affine CU         │
│                                                          1502   │
└─────────────────────────────────────────────────────────────┘
```

FIG. 15

```
┌─────────────────────────────────────────────────────────────┐
│ Obtain a plurality of sub-blocks within an affine CU of a video │
│ frame                                                           │
│                                                          1601   │
└─────────────────────────────────────────────────────────────┘
                              │
                              ▼
┌─────────────────────────────────────────────────────────────┐
│ Enable ASP for the plurality of non-boundary sub-block and      │
│ disable OBMC for the plurality of non-boundary sub-blocks       │
│                                                          1602   │
└─────────────────────────────────────────────────────────────┘
```

FIG. 16

OVERLAPPED BLOCK MOTION COMPENSATION FOR INTER PREDICTION

CROSS-REFERENCE TO RELATED APPLICATION

The present application claims priority to U.S. Provisional Application No. 63/167,619, entitled "Overlapped Block Motion Compensation for Inter Prediction," filed on Mar. 29, 2021, the entirety of which is incorporated by reference for all purposes.

FIELD

The present disclosure relates to video coding and compression, and in particular but not limited to, methods and apparatus on overlapped block motion compensation (OBMC) for inter prediction.

BACKGROUND

Various video coding techniques may be used to compress video data. Video coding is performed according to one or more video coding standards. For example, nowadays, some well-known video coding standards include Versatile Video Coding (VVC), High Efficiency Video Coding (HEVC, also known as H.265 or MPEG-H Part2) and Advanced Video Coding (AVC, also known as H.264 or MPEG-4 Part 10), which are jointly developed by ISO/IEC MPEG and ITU-T VECG. AOMedia Video 1 (AVi) was developed by Alliance for Open Media (AOM) as a successor to its preceding standard VP9. Audio Video Coding (AVS), which refers to digital audio and digital video compression standard, is another video compression standard series developed by the Audio and Video Coding Standard Workgroup of China. Most of the existing video coding standards are built upon the famous hybrid video coding framework i.e., using block-based prediction methods (e.g., inter-prediction, intra-prediction) to reduce redundancy present in video images or sequences and using transform coding to compact the energy of the prediction errors. An important goal of video coding techniques is to compress video data into a form that uses a lower bit rate while avoiding or minimizing degradations to video quality.

SUMMARY

The present disclosure provides examples of techniques relating to improving the coding efficiency and simplifying the complexity of OBMC.

According to a first aspect of the present disclosure, there is provided a method for video decoding. The method includes: obtaining a plurality of sub-blocks within an affine coding unit (CU) of a video frame, where the plurality of sub-blocks include a plurality of boundary sub-blocks and a plurality of non-boundary sub-blocks; and applying both OBMC and affine secondary prediction (ASP) to at least one sub-block to generate a sub-block-based prediction for the affine Cu.

According to a second aspect of the present disclosure, there is provided a method for video decoding. The method includes: obtaining a plurality of sub-blocks within an affine CU of a video frame, where the plurality of sub-blocks include a plurality of boundary sub-blocks and a plurality of non-boundary sub-blocks; and enabling ASP for the plurality of non-boundary sub-block and disabling OBMC for the non-boundary sub-block.

According to a third aspect of the present disclosure, there is provided an apparatus for video decoding. The apparatus includes one or more processors and a memory configured to store instructions executable by the one or more processors. Further, the one or more processors, upon execution of the instructions, are configured to perform the method according to the first aspect.

According to a fourth aspect of the present disclosure, there is provided an apparatus for video decoding. The apparatus includes one or more processors and a memory configured to store instructions executable by the one or more processors. Further, the one or more processors, upon execution of the instructions, are configured to perform the method according to the second aspect.

According to a fifth aspect of the present disclosure, there is provided a non-transitory computer-readable storage medium storing computer-executable instructions that, when executed by one or more computer processors, causing the one or more computer processors to perform the method according to the first aspect.

According to a sixth aspect of the present disclosure, there is provided a non-transitory computer-readable storage medium storing computer-executable instructions that, when executed by one or more computer processors, causing the one or more computer processors to perform the method according to the second aspect.

BRIEF DESCRIPTION OF THE DRAWINGS

A more particular description of the examples of the present disclosure will be rendered by reference to specific examples illustrated in the appended drawings. Given that these drawings depict only some examples and are not therefore considered to be limiting in scope, the examples will be described and explained with additional specificity and details through the use of the accompanying drawings.

FIG. 15 illustrates a flowchart illustrating a process for video decoding in accordance with some implementations of the present disclosure.

FIG. 16 illustrates a flowchart illustrating a process for video decoding in accordance with some implementations of the present disclosure.

DETAILED DESCRIPTION

Figure 1:
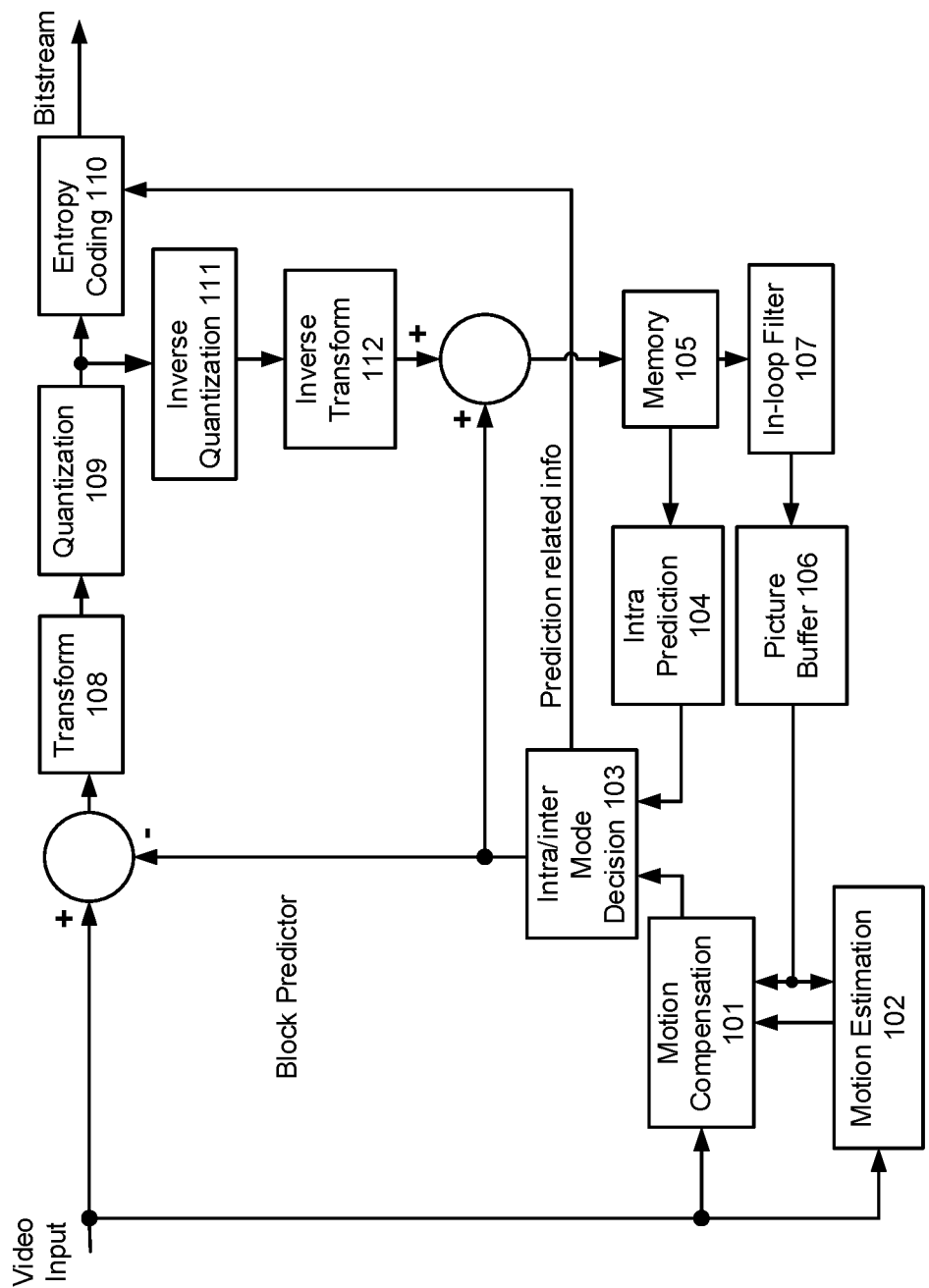
FIG. 1 is a block diagram illustrating a block-based video encoder in accordance with some implementations of the present disclosure.
Figures 2A, 2B, 2C:
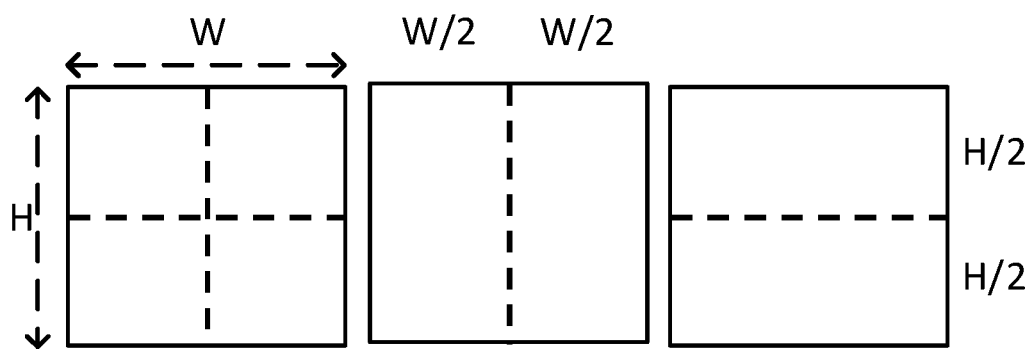
FIG. 2A is schematic diagram illustrating quaternary partitioning tree splitting mode in accordance with some implementations of the present disclosure.
FIG. 2B is schematic diagram illustrating vertical binary partitioning tree splitting mode in accordance with some implementations of the present disclosure.
FIG. 2C is schematic diagram illustrating horizontal binary partitioning tree splitting mode in accordance with some implementations of the present disclosure.
Figures 2D, 2E:
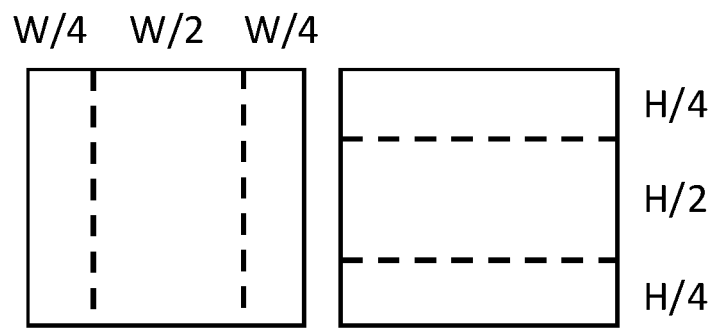
FIG. 2D is schematic diagram illustrating vertical ternary partitioning tree splitting mode in accordance with some implementations of the present disclosure.
FIG. 2E is schematic diagram illustrating horizontal ternary partitioning tree splitting mode in accordance with some implementations of the present disclosure.

Reference will now be made in detail to specific implementations, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used. For example, it will be apparent to one of ordinary skill in the art that the subject matter presented herein can be implemented on many types of electronic devices with digital video capabilities.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

Throughout the disclosure, the terms "first," "second," "third," etc. are all used as nomenclature only for references to relevant elements, e.g., devices, components, compositions, steps, etc., without implying any spatial or chronological orders, unless expressly specified otherwise. For example, a "first device" and a "second device" may refer to two separately formed devices, or two parts, components, or operational states of a same device, and may be named arbitrarily.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

As used herein, the term "if" or "when" may be understood to mean "upon" or "in response to" depending on the context. These terms, if appear in a claim, may not indicate that the relevant limitations or features are conditional or optional. For example, a method may comprise steps of: i) when or if condition X is present, function or action X' is performed, and ii) when or if condition Y is present, function or action Y' is performed. The method may be implemented with both the capability of performing function or action X', and the capability of performing function or action Y'. Thus, the functions X' and Y' may both be performed, at different times, on multiple executions of the method.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

The first version of the HEVC standard was finalized in October 2013, which offers approximately 50% bit-rate saving or equivalent perceptual quality compared to the prior generation video coding standard H.264/MPEG AVC. Although the HEVC standard provides significant coding improvements than its predecessor, there is evidence that superior coding efficiency can be achieved with additional coding tools over HEVC. Based on that, both VCEG and MPEG started the exploration work of new coding technologies for future video coding standardization. one Joint Video Exploration Team (JVET) was formed in October 2015 by ITU-T VECG and ISO/IEC MPEG to begin significant study of advanced technologies that could enable substantial enhancement of coding efficiency. One reference software called joint exploration model (JEM) was maintained by the JVET by integrating several additional coding tools on top of the HEVC test model (HM)

The joint call for proposals (CfP) on video compression with capability beyond HEVC was issued by ITU-T and ISO/IEC. In April 2018, 23 CfP responses were received and evaluated at the 10-th JVET meeting, which demonstrated compression efficiency gain over the HEVC around 40%. Based on such evaluation results, the JVET launched a new project to develop the new generation video coding standard that is named as Versatile Video Coding (VVC). In the same month, one reference software codebase, called VVC test model (VTM), was established for demonstrating a reference implementation of the VVC standard.

The first generation AVS standard includes Chinese national standard "Information Technology, Advanced Audio Video Coding, Part 2: Video" (known as AVS1) and "Information Technology, Advanced Audio Video Coding Part 16: Radio Television Video" (known as AVS+). It can offer around 50% bit-rate saving at the same perceptual quality compared to MPEG-2 standard. The AVS1 standard video part was promulgated as the Chinese national standard in February 2006. The second generation AVS standard includes the series of Chinese national standard "Information Technology, Efficient Multimedia Coding" (knows as AVS2), which is mainly targeted at the transmission of extra HD TV programs. The coding efficiency of the AVS2 is double of that of the AVS+. In May 2016, the AVS2 was issued as the Chinese national standard. Meanwhile, the AVS2 standard video part was submitted by Institute of Electrical and Electronics Engineers (IEEE) as one international standard for applications. The AVS3 standard is one new generation video coding standard for UHD video application aiming at surpassing the coding efficiency of the latest international standard HEVC. In March 2019, at the 68-th AVS meeting, the AVS3-P2 baseline was finished, which provides approximately 30% bit-rate savings over the HEVC standard. Currently, there is one reference software, called high performance model (HPM), is maintained by the AVS group to demonstrate a reference implementation of the AVS3 standard.

Like preceding standards such as HEVC, both the VVC and AVS3 are built upon the block-based hybrid video coding framework. FIG. 1 is a block diagram illustrating a block-based video encoder in accordance with some implementations of the present disclosure. The input video signal is processed block by block (called coding units (CUs)). One CU can be up to 128×128 pixels. However, different from the HEVC which partitions blocks only based on quad-trees, in the VVC, one coding tree unit (CTU) is split into CUs to adapt to varying local characteristics based on quad/binary/ternary-tree. Additionally, the concept of multiple partition unit type in the HEVC is removed, i.e., the separation of CU, prediction unit (PU) and transform unit (TU) does not exist in the VVC anymore; instead, each CU is always used as the basic unit for both prediction and transform without further partitions. In the multi-type tree structure, one CTU is firstly partitioned by a quad-tree structure. Then, each quad-tree leaf node can be further partitioned by a binary and ternary tree structure.

As shown in FIGS. 2A to 2E, there are five splitting types, quaternary partitioning, horizontal binary partitioning, vertical binary partitioning, horizontal ternary partitioning, and vertical ternary partitioning. In FIG. 1, spatial prediction and/or temporal prediction may be performed (e.g., via motion compensation 101, motion estimation 102, intra/inter mode decision 103, intra prediction 104). Spatial prediction (or "intra prediction") uses pixels from the samples of already coded neighboring blocks (which are called reference samples) in the same video picture/slice to predict the current video block. Spatial prediction reduces spatial redundancy inherent in the video signal. Temporal prediction (also referred to as "inter prediction" or "motion compensated prediction") uses reconstructed pixels from the already coded video pictures to predict the current video block. Temporal prediction reduces temporal redundancy inherent in the video signal. Temporal prediction signal for a given CU is usually signaled by one or more motion vectors (MVs) which indicate the amount and the direction of motion between the current CU and its temporal reference. Also, if multiple reference pictures are supported, one reference picture index is additionally sent, which is used to identify from which reference picture in the reference picture store (e.g., memory 105, picture buffer 106) the temporal prediction signal comes. After spatial and/or temporal prediction, the mode decision block (e.g., intra/inter mode decision 103) in the encoder chooses the best prediction mode, for example based on the rate-distortion optimization method. The prediction block is then subtracted from the current video block; and the prediction residual is de-correlated using transform and quantized (e.g., via transform 108, quantization 109). The quantized residual coefficients are inverse quantized and inverse transformed to form the reconstructed residual (e.g., via inverse quantization 111, inverse transform 112), which is then added back to the prediction block to form the reconstructed signal of the CU. Further in-loop filtering (e.g., in-loop filter 107), such as deblocking filter, sample adaptive offset (SAO) and adaptive in-loop filter (ALF) may be applied on the reconstructed CU before it is put in the reference picture store and used to code future video blocks. To form the output video bit-stream, coding mode (inter or intra), prediction mode information, motion information, and quantized residual coefficients are all sent to the entropy coding unit (e.g., entropy coding 110) to be further compressed and packed to form the bit-stream.

Figure 3:
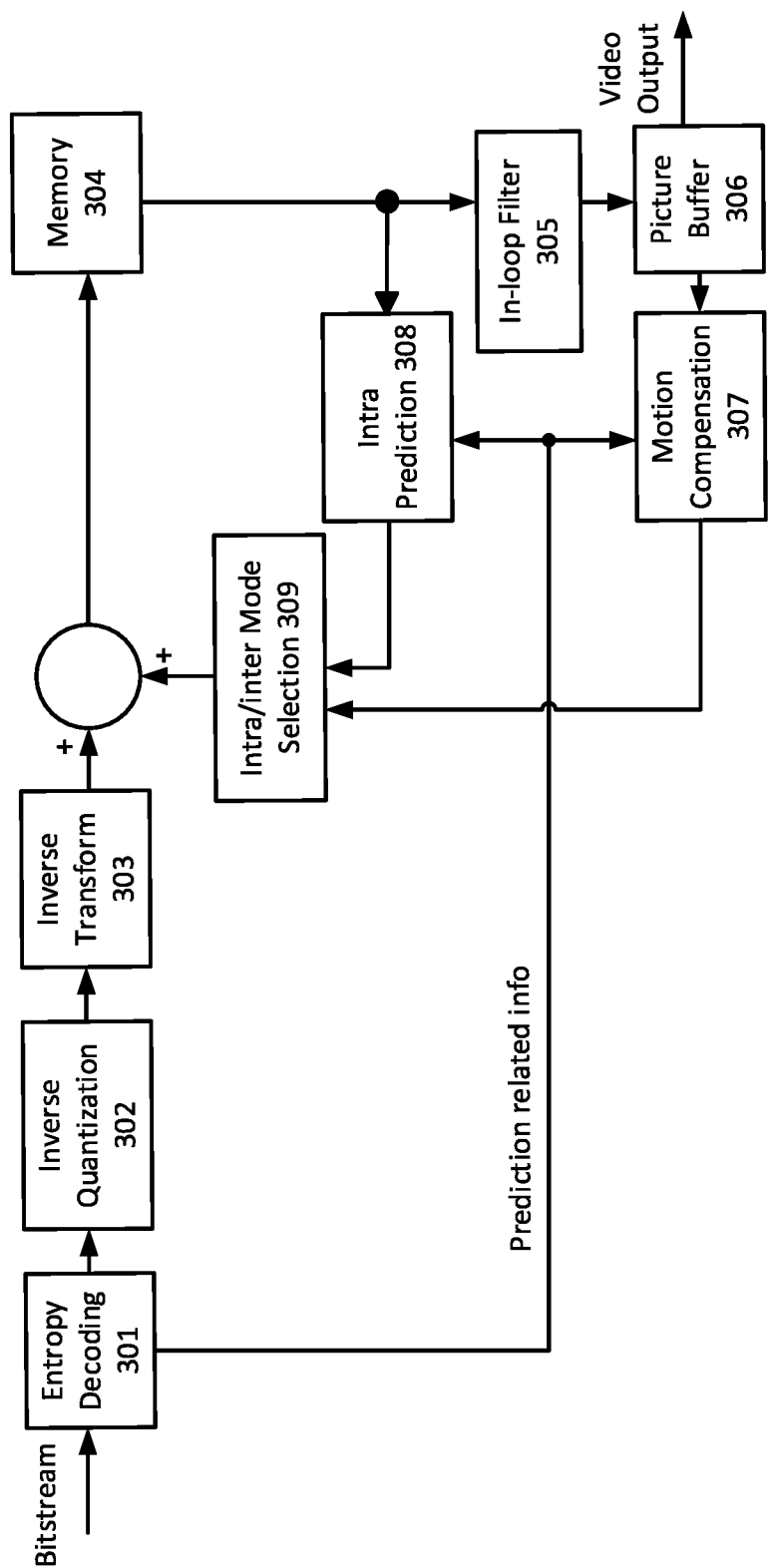
FIG. 3 is a block diagram illustrating a block-based video decoder in accordance with some implementations of the present disclosure.

FIG. 3 is a block diagram illustrating a block-based video decoder in accordance with some implementations of the present disclosure. The video bit-stream is first entropy decoded at entropy decoding unit (e.g., entropy decoding 301). The coding mode and prediction information are sent to either the spatial prediction unit (if intra coded) (e.g., intra prediction 308) or the temporal prediction unit (if inter coded) (e.g., motion compensation 307) to form the prediction block. The residual transform coefficients are sent to inverse quantization unit (e.g., inverse quantization 302) and inverse transform unit (e.g., inverse transform 303) to reconstruct the residual block. The prediction block and the residual block are then added together (e.g., through intra/inter mode selection 309 and/or stored in memory 304). The reconstructed block may further go through in-loop filtering before it is stored in reference picture store (e.g., picture buffer 306). The reconstructed video in reference picture store is then sent out to drive a display device, as well as used to predict future video blocks.

In general, the basic inter prediction techniques that are applied in the VVC and the AVS3 are kept the same as that of the HEVC except that several modules are further extended and/or enhanced. For instance, block-matching based motion compensation (MC) is still used as the backbone of the VVC inter coding framework where one coding block can only be associated with one single MV when the coding block is uni-predicted or two MVs when the coding block is bi-predicted. Though the block-based MC is efficient to handle uniform translational motion, it still insufficient to capture the real correlation between pictures in temporal domain because of complicated motion of cameras and irregularity of moving objects. Correspondingly, such inaccurate motion often leads to blocking artifacts to the reconstructed video signal. The OBMC is one method that has been demonstrated to be one efficient method that overcomes the shortcomings of the conventional block-based MC. The basic idea of the OBMC is to use the MVs from the neighbor blocks to perform the motion compensation on the current block and combine the multiple prediction signals using the neighboring MVs to generate the final prediction signal of the current block. This can substantially reduce prediction error and mitigate blocking artifacts at prediction stage. The main focus of this disclosure is to further improve the coding efficiency of the existing OBMC mode. Additionally, some methods are also proposed to reduce the OBMC computational complexity and make it more friendly for practical hardware implementations. To facilitate the following description, the main technical aspects of some existing coding tools in the current VVC and AVS standards that are closely related with the proposed technologies in the disclosure are briefly reviewed.

Sub-Block-Based Motion Compensation

In the HEVC and its predecessors, each coding block has at most one MV for one prediction direction. In contrast, several sub-block-level motion compensation techniques are adopted in both the VVC and the AVS3 to improve the motion compensation efficiency by increasing the granularity of MV derivation. Specifically, when any of those sub-block modes is applied, one coding block is further split into multiple small sub-blocks and the motion information (i.e., the MV and the associated reference picture) for each sub-block is derived separately. The sub-block motion information is then used to generate the prediction signal of each sub-block (and eventually the block) at the motion compensation stage. In the following, some main sub-block inter coding modes that are adopted in the VVC and AVS3 standards are overviewed.

Sub-Block-Based Temporal Motion Vector Prediction

The VVC supports the sub-block-based temporal motion vector prediction (SbTMVP) method. Similar to the temporal motion vector prediction (TMVP) in HEVC, SbTMVP uses the motion field in the collocated picture to improve the MV precision of the inter CUs in the current picture.

Figure 4:
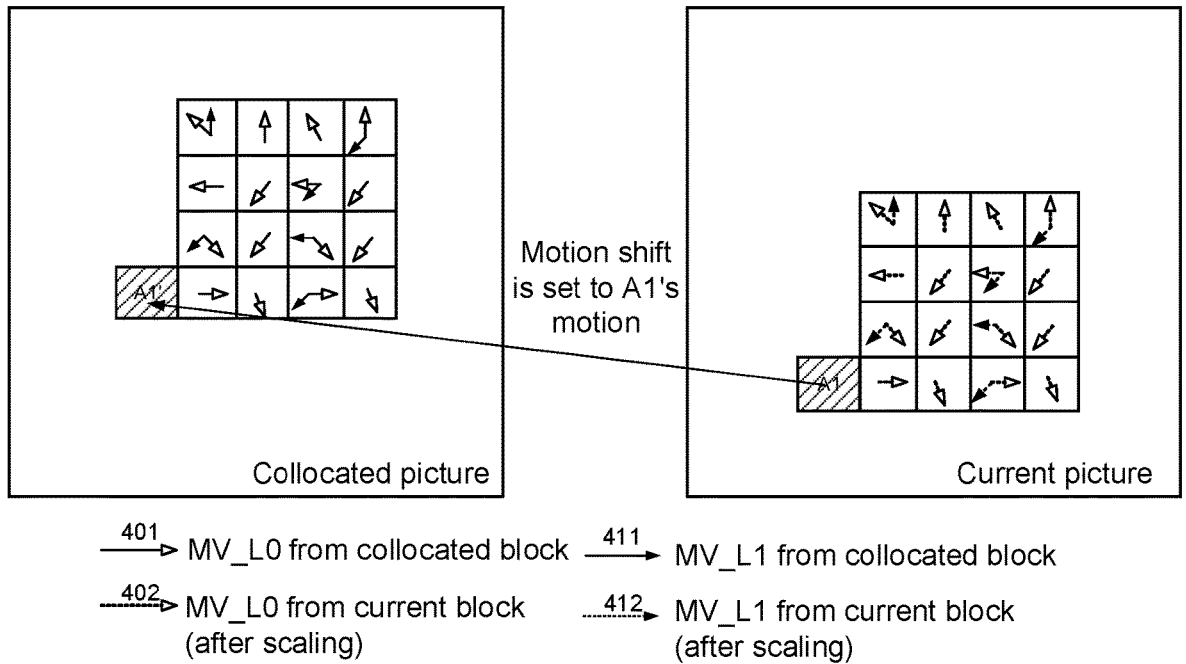
FIG. 4 illustrates schematic diagrams of sub-block-level motion derivation of sub-block-based temporal motion vector prediction (SbTMVP) in accordance with some implementations of the present disclosure.

The sub-block-level motion derivation of the SbTMVP mode is illustrated in FIG. 4. Specifically, the SbTMVP predicts the MVs of the sub-blocks inside the current CU by two steps. In the first step, the collocated block that is used to fetch the sub-blocks' motion is firstly identified from the motion information of the spatial neighboring block of the current block. Specifically, in the current ATMVP design, the spatial neighbor A1 in FIG. 4 is considered. If A1 owns one MV (either L0 or L1) which uses the collocated picture (which is signaled in bit-stream) as its reference picture, the corresponding MV of block A1 is selected to identify the collocated block in the collocated picture. The location of the collocated block in the collocated picture is determined by adding the MV of block A1 to the coordinates of the current block. In the second step, for each sub-block in the current block, its motion information is derived from its corresponding small block in the collocated block. Specifically, after the motion information of each small block in the collocated block (as indicated by the arrows 401, 411) is identified, it is converted to the motion information (as indicated by the arrows 402, 412) of the corresponding sub-block in the current block in the same way as the existing temporal motion vector prediction (TMVP) in HEVC where temporal motion vector scaling may be applied.

In the AVS3 standard, one similar tool called enhanced temporal motion vector prediction (ETMVP) is also adopted which follows the same design spirit of the SbTMVP but with subtle differences in some design details.

Affine Mode

In conventional MC techniques, only translation motion model is applied for motion compensated prediction. While in the real world, there are many kinds of motion, e.g., zoom in/out, rotation, perspective motions and other irregular motions. In the VVC and AVS3 standards, affine motion compensated prediction is applied by signaling one flag for each inter CU to indicate whether the translation motion model or the affine motion model is applied for inter prediction. In the current affine design, two affine modes, including 4-parameter affine mode and 6-parameter affine mode, are supported for one affine coding block.

Figure 5:
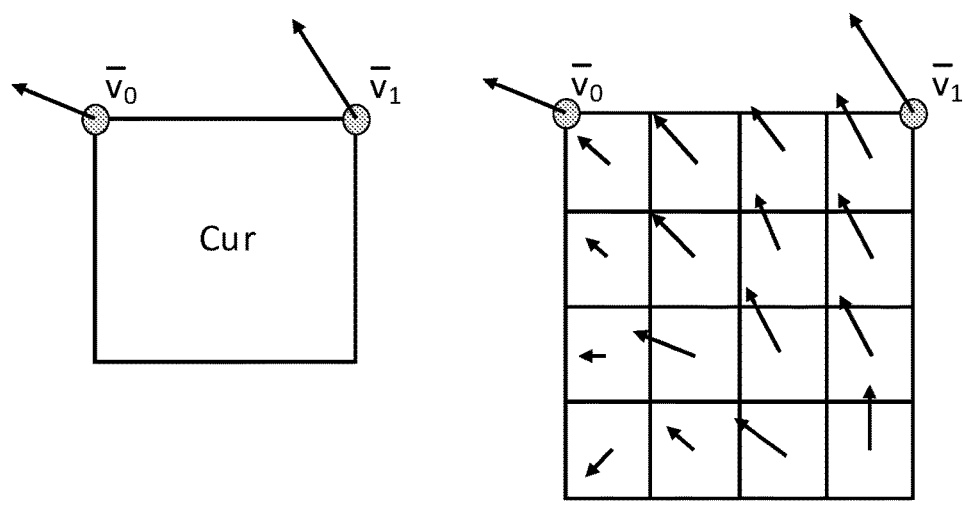
FIG. 5 illustrates a schematic diagram of a 4-parameter affine model in accordance with some implementations of the present disclosure.

The 4-parameter affine model has the following parameters: two parameters for translation movement in horizontal and vertical directions respectively, one parameter for zoom motion and one parameter for rotation motion for both directions. Horizontal zoom parameter is equal to vertical zoom parameter. Horizontal rotation parameter is equal to vertical rotation parameter. To achieve a better accommodation of the motion vectors and affine parameter, those affine parameters are translated into two MVs (which are also called control point motion vector (CPMV)) located at the top-left corner and top-right corner of a current block. FIG. 5 illustrates a schematic diagram of a 4-parameter affine model in accordance with some implementations of the present disclosure. As shown in FIG. 5, the affine motion field of the block is described by two control point MVs ($V_0$, $V_1$). Based on the control point motion vector, the motion field ($v_x$, $v_y$) of one affine coded block is described as $$v_x = \frac{(v_{1x} - v_{0x})}{w} - \frac{(v_{1y} - v_{0y})}{w} y + v_{0x} \quad (1)$$

$$v_y = \frac{(v_{1y} - v_{0y})}{w} x + \frac{(v_{1x} - v_{0x})}{w} y + v_{0y}$$

Figure 6:
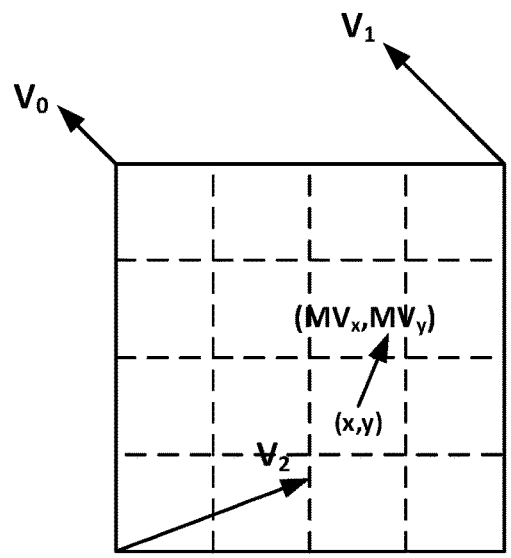
FIG. 6 illustrates a schematic diagram of a 6-parameter affine model in accordance with some implementations of the present disclosure.
Figure 7A:
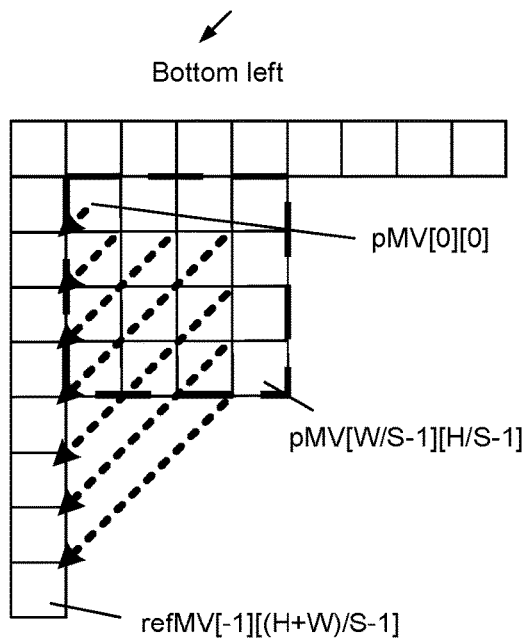
FIG. 7A illustrates schematic diagrams of motion vector angular prediction (MVAP) mode in bottom-left direction in accordance with some implementations of the present disclosure.
Figure 7B:
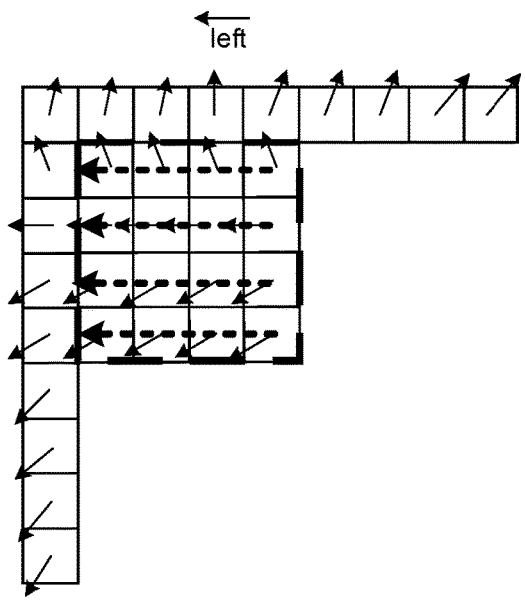
FIG. 7B illustrates schematic diagrams of MVAP mode in left direction in accordance with some implementations of the present disclosure.
Figure 7C:
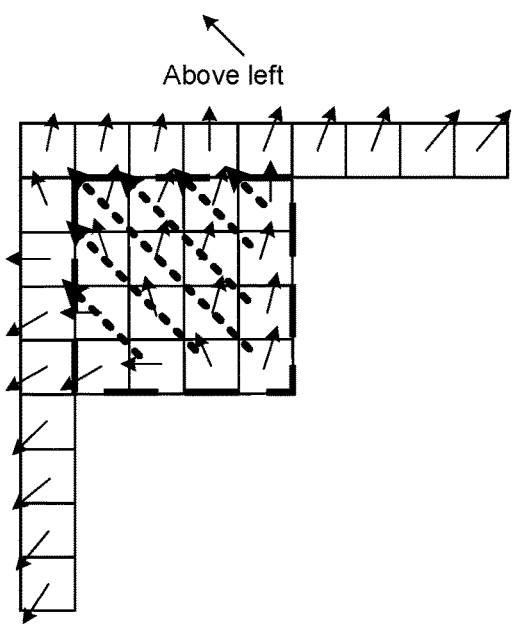
FIG. 7C illustrates schematic diagrams of MVAP mode in above-left direction in accordance with some implementations of the present disclosure.
Figure 7D:
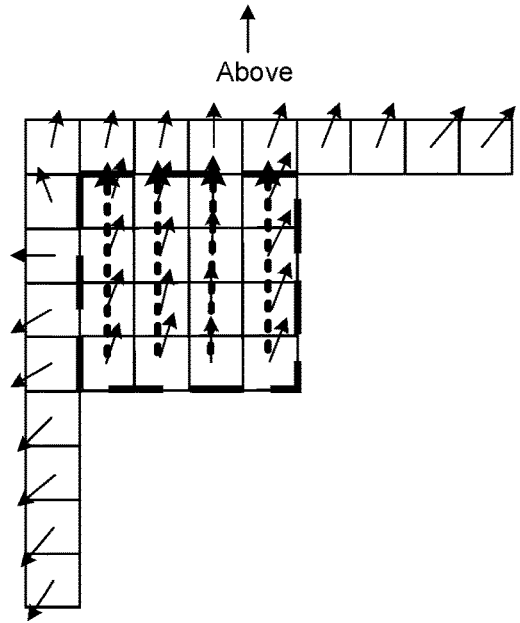
FIG. 7D illustrates schematic diagrams of MVAP mode in above direction in accordance with some implementations of the present disclosure.
Figure 7E:
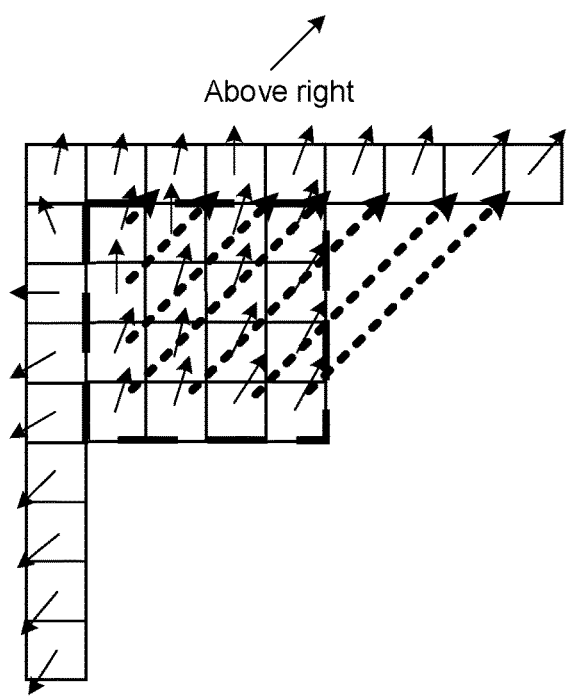
FIG. 7E illustrates schematic diagrams of MVAP mode in above-right direction in accordance with some implementations of the present disclosure.

The 6-parameter affine mode has following parameters: two parameters for translation movement in horizontal and vertical directions respectively, one parameter for zoom motion and one parameter for rotation motion in horizontal direction, one parameter for zoom motion and one parameter for rotation motion in vertical direction. The 6-parameter affine motion model is coded with three MVs at three CPMVs. As shown in FIG. 6, three control points of one 6-parameter affine block are located at the top-left, top-right and bottom left corner of the block. The motion at top-left control point is related to translation motion, and the motion at top-right control point is related to rotation and zoom motion in horizontal direction, and the motion at bottom-left control point is related to rotation and zoom motion in vertical direction. Compared to the 4-parameter affine motion model, the rotation and zoom motion in horizontal direction of the 6-parameter may not be same as those motion in vertical direction. Assuming ($V_0$, $V_1$, $V_2$) are the MVs of the top-left, top-right and bottom-left corners of the current block in FIG. 6, the motion vector of each sub-block ($v_x$, $v_y$) is derived using three MVs at control points as:

$$v_x = v_{0x} + (v_{1x} - v_{0x})*x/w + (v_{2x} - v_{0x})*y/h$$

$$v_y = v_{0y} + (v_{1y} - v_{0y})*x/w + (v_{2y} - v_{0y})*y/h \quad (2)$$

To simplify the computational complexity of affine prediction, sub-block-based MC is applied to derive the prediction samples of affine mode. Specifically, given the selected CPMVs of one affine CU, the MV of each 4×4 sub-block inside the CU is derived based on equations (1) and (2) using the center of the sub-block as the target coordinates (i.e., x and y in (1) and (2)). It is assumed that all the samples within the sub-block share the same MV; correspondingly, the calculated MV will be used to generate the predication samples of the sub-block using the existing motion compensation interpolation filtering (MC-IF) process.

Affine Secondary Prediction

The affine model (as indicated by the control-point motion vectors) can be used to derive one specific motion at each sample position within one affine CU. However, this needs a large amount of computation and memory bandwidth consumption, both of which are very costly for hardware/software codec implementations. Therefore, in both VVC and AVS standards, one sub-block-based MC method is applied for the affine mode where one affine CU is firstly divided into 8×8/4×4 sub-blocks and the samples within a sub-block are assigned with one same MV that is derived at the center of the sub-block. Obviously, such design may lead to non-negligible loss of prediction efficiency, given that the derived sub-block-level MVs cannot reflect the true affine motion at each sample position inside one affine CU. To further improve the quality of affine prediction, one method which is called affine secondary prediction (ASP) is applied to provide sample-wise prediction refinement on top of the existing prediction samples of affine mode Specifically, the method applies one 3-by-3 filter on top of the prediction samples generated from the sub-block-based motion compensation. Additionally, the filter coefficients that are applied at each sample position are derived based on the MV difference between the true MV calculated at each sample position and the MV of the sub-block where the sample is located at. Specifically, the prediction samples of the ASP mode are derived by the following steps:

1) Sub-block-based MC: The sub-block-based affine motion compensation is performed to generate the prediction sample I(i,j) at each sample location (i,j).

2) MV difference calculation: One MV difference Δv(i,j), is calculated at each sample location (i,j) as:

$$\Delta v_x(i,j) = c*\Delta x + d*\Delta y$$

$$\Delta v_y(i,j) = e*\Delta x + f*\Delta y$$

where c, d, e and f are the parameters derived based on either 4/6-parameter affine model, Δx and Δy are horizontal and vertical offset from the sample location (i,j) to the corresponding sample location that is used to calculate the MV for the sub-block MC of the sub-block containing the sample location (i,j). Specifically, based on the position of the sub-block within the current CU, the values of Δx and Δy are derived as follows:

For the top-left sub-block, Δx=i, Δy=j.

For the top-right sub-block, Δx=(i−subwidth+1), Δy=j.

For the bottom-left sub-block, Δx=i, Δy=(j−subheight+1) when 6-parameter affine model is applied; and Δx=(i−(subwidth>>1)−0.5), Δy=(j−(subheight>>1)−0.5) when 4-parameter affine model is applied.

For other sub-blocks, Δx=(i−(subwidth>>1)−0.5), Δy=(j−(subheight>>1)−0.5).

3) Secondary prediction filtering: The variables $\max_{\Delta v_x}$ and $\max_{\Delta v_y}$ are firstly calculated as:

$$\begin{cases} \max_{\Delta v_x} = \underset{(i,j)}{\arg\text{Max}}(|\Delta v_x(i,j)|) \\ \max_{\Delta v_y} = \underset{(i,j)}{\arg\text{Max}}(|\Delta v_y(i,j)|) \end{cases}$$

Then, the prediction samples of the sub-block-based MC are further adjusted by applying additional filtering operations according to the following conditions:

a. If $\max_{\Delta v_x} \geq \text{threshv}_x$ and $\max_{\Delta v_y} \geq \text{threshv}_y$:

| | | |
|---|---|---|
| $-\Delta v_x - \Delta v_y$ | $-(\Delta v_y << 3)$ | $\Delta v_x - \Delta v_y$ |
| $-(\Delta v_x << 3)$ | 16 | $\Delta v_x << 3$ |
| $-\Delta v_x + \Delta v_y$ | $\Delta v_y << 3$ | $\Delta v_x + \Delta v_y$ | b. Else if $\max_{\Delta v_x} \geq \text{threshv}_x$ and $\max_{\Delta v_y} < \text{threshv}_y$:

| | | |
|---|---|---|
| $-\Delta v_x$ | 2 | $\Delta v_x$ | c. Else if $\max_{\Delta v_x} < \text{threshv}_x$ and $\max_{\Delta v_y} \geq \text{threshv}_y$:

| |
|---|
| $-\Delta v_y$ |
| 2 |
| $\Delta v_y$ | where $\text{threshv}_x$ and $\text{threshv}_y$ are predefined constant thresholds. Additionally, when the positions of the predication samples used for the filtering operation are outside the boundary of current CU, they are filled by extending the prediction samples on the CU boundaries to the extended area.

Motion Vector Angular Prediction

To further improve the inter prediction efficiency, another sub-block motion prediction mode which is known as motion vector angular prediction (MVAP) is applied in the AVS3. Similar to the SbTMVP and affine mode, the MVAP conducts the motion compensated prediction on sub-block level where the MVs of each sub-block are generated from the corresponding MVs of the neighboring reconstructed blocks of the current CU. FIGS. 7A-7E illustrate schematic diagrams of motion vector angular prediction (MVAP) mode respectively in bottom-left direction, left direction, above-left direction, above direction, and above-right direction in accordance with some implementations of the present disclosure. As illustrated in FIGS. 7A-7E, the MVs of the sub-blocks inside one MVAP CU are projected from the neighboring MVs on the top and left boundaries of the current CU according to one specific projection direction. In the current MVAP design, there are in total 5 different MV prediction directions, including bottom-left, left, above-left, above and above-right. For each specific prediction direction, the corresponding MV of each sub-block are calculated as follows:

1) Bottom-left direction:

$$pMV[x][y] = refMV[-1][x+y+1] \quad (3)$$

2) Left direction:

$$pMV[x][y] = refMV[-1][y] \quad (4)$$

3) Above-left direction:

$$pMV[x][y] = \begin{cases} refMV[x-y-1][-1], & x \geq y \\ refMV[-1][y-x-1], & x < y \end{cases} \quad (5)$$

4) Above direction:

$$pMV[x][y] = refMV[x][-1] \quad (6)$$

5) Above-right direction:

$$pMV[x][y] = refMV[x+y+1][-1] \quad (7)$$

where refMV denotes the MV of the neighboring blocks and pMV denotes the MV of the sub-block inside the current CU; x and y denotes the coordinate of one sub-block with the above-left corner of the current CU as the origin.

Additionally, in case one neighboring MV are unavailable (e.g., neighboring sub-block is invalid or coded by intra mode), the corresponding MV is generated by repeating the available MV of the closest neighbor to the sub-block.

Overlapped Block Motion Compensation

Figures 8, 9:
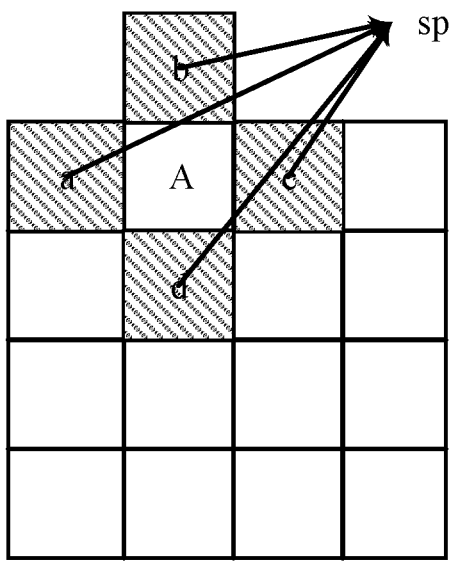
FIG. 8 illustrates a schematic diagram of an OBMC process for the CUs that are coded without sub-block motion compensation in accordance with some implementations of the present disclosure.
FIG. 9 illustrates a schematic diagram of an OBMC process for the CUs that are coded by sub-block modes in accordance with some implementations of the present disclosure.

The OBMC is applied in the JEM to remove the blocking artifact at the MC stage. As illustrated before, basic idea of the OBMC is to use the MVs from the neighbor blocks to perform the motion compensation on the current block and combine the multiple prediction signals using the neighboring MVs to generate the final prediction signal of the CU. In the JEM, the OBMC is performed for the top and left boundaries of the current CU. Additionally, when one video block is coded in one sub-block mode, the OBMC is also performed on all the inner boundaries (i.e., top, left, bottom, and right boundaries) of each sub-block. FIG. 8 illustrates the OBMC process that is applied to the CUs without sub-block-level motion compensation. As shown in FIG. 8, $B_1$ to $B_7$ are respectively sub-blocks on the top and left boundaries of the current CU and $N_1$ to $N_8$ are the causal neighboring sub-blocks above and left to the current CU. When the OBMC is applied to one sub-block (e.g., the sub-block A in FIG. 9), in addition to the left and top neighbors of one sub-block, the MVs of the neighboring sub-blocks that are to the right and bottom of the current sub-block are also used to derive the prediction signals; then, the four prediction blocks are averaged to generate the final prediction signal of the current sub-block.

FIG. 9 illustrates a schematic diagram of an OBMC process for the CUs that are coded by sub-block modes in accordance with some implementations of the present disclosure. As shown in FIG. 9, OBMC is applied to all the sub-CU blocks (e.g., sub-CU block A) using MVs from all four neighboring blocks (e.g., shaded sub-CU block a, b, c, d).

Weighted average is used in OBMC to generate the prediction signal of one sub-block. Denote the prediction signal using the motion vector of one neighboring sub-block as PN and the prediction signal using the motion vector of the current sub-block is denoted as PC. When the OBMC is applied, the samples in the first/last four rows/columns of PN are weighted averaged with the samples at the same positions in PC. The samples to which the weighted averaging is applied are determined based on the location of the corresponding neighboring sub-block. Specifically, when the neighboring sub-block is the top neighbor (e.g. sub-block b in FIG. 9), the samples in the first four rows of the current sub-block are adjusted; when the neighboring sub-block is the bottom neighbor (e.g. sub-block d in FIG. 9), the samples in the last four rows of the current sub-block are adjusted; when the neighboring sub-block is left neighbor (e.g., sub-block a in FIG. 9), the samples in the first four columns of the current block are adjusted; when the neighboring sub-block is right neighbor, the samples in the last four columns of the current sub-block are adjusted. When the current block is not coded in a sub-block mode, weighting factors {1/4, 1/8, 1/16, 1/32} are used for the first four rows/columns of PN and weighting factors {3/4, 7/8, 15/16, 31/32} are used for the first four rows/columns of PC. When the current block is coded in sub-block mode, then only the first two rows/columns of PN and PC are averaged. In this case, weighting factors {1/4, 1/8} are used for PN and weighting factors {3/4, 7/8} are used for PC.

Geometric Partition Mode

In the VVC, a geometric partitioning mode is supported for inter prediction. The geometric partitioning mode is signaled by one CU-level flag as one special merge mode. In the current GPM design, 64 partitions are supported in total by the GPM mode for each possible CU size with both width and height not smaller than 8 and not larger than 64, excluding 8×64 and 64×8.

Figure 10:
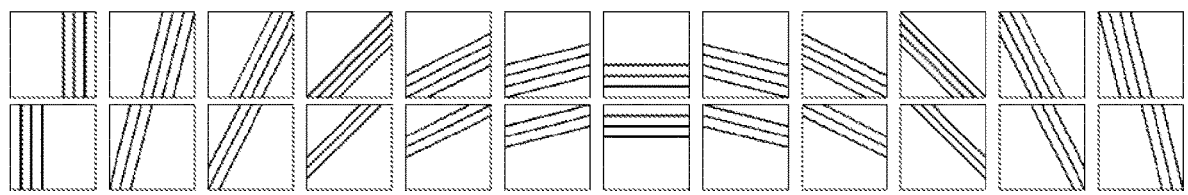
FIG. 10 illustrates a schematic diagram of allowed GPM partitions according to one or more aspects of the present disclosure.

When this mode is used, a CU is split into two parts by a geometrically located straight line as shown in FIG. 10. The location of the splitting line is mathematically derived from the angle and offset parameters of a specific partition. Each part of a geometric partition in the CU is inter-predicted using its own motion; only uni-prediction is allowed for each partition, that is, each part has one motion vector and one reference index. The uni-prediction motion constraint is applied to ensure that same as the conventional bi-prediction, only two motion compensated prediction are needed for each CU. If geometric partitioning mode is used for the current CU, then a geometric partition index indicating the partition mode of the geometric partition (angle and offset), and two merge indices (one for each partition) are further signaled. The number of maximum GPM candidate size is signaled explicitly at sequence level. In the AVS3, the tool is also known as angular weighted prediction (AWP) which follows the similar design of the GPM mode with some minor differences such as different split directions and offsets, the way of generating uni-prediction MVs and so forth.

Inter Prediction Filter

To further improve the prediction efficiency, inter prediction filter (InterPF) which combines the intra prediction and the merge mode based inter prediction of one CU is applied in the AVS3 standard. Specifically, for each merge CU, one additional flag is signaled to indicate whether the InterPF mode is enabled for the current CU or not. When the flag is false, the InterPF is disabled and the regular inter prediction is applied to generate the prediction samples of the current CU; when the first flag is true, the InterPF is applied to the current CU and another flag is signaled to further indicate which one of two InterPF modes is used. The two InterPF modes are described as follows:

InterPF Mode One: the combined prediction samples are derived as the weighted average of the inter prediction samples and five neighboring reconstructed samples from left, right, above, below:

$$\text{Pred}(x,y)=(\text{Pred\_inter}(x,y)*5+\text{Pred\_}Q(x,y)*3)>>3$$

$$\text{Pred\_}Q(x,y)=(\text{Pred\_}V(x,y)+\text{Pred\_}H(x,y)+1)>>2 \qquad (8)$$

$$\text{Pred\_}V(x,y)=((h-1-y)*\text{Rec}(x,-1)+(y+1)*\text{Rec}(-1,h)+(h>>1))>>\log 2(h)$$

$$\text{Pred\_}H(x,y)=((w-1-x)*\text{Rec}(-1,y)+(x+1)*\text{Rec}(w,-1)+(w>>1))>>\log 2(w)$$

InterPF Mode Two: the combined prediction samples are derived as the weighted average of the inter prediction samples and three neighboring reconstructed samples from left, above:

$$P'(x,y)=f(x)\cdot P(-1,y)+f(y)\cdot P(x,-1)+(1-f(x)-f(y))\cdot P(x,y) \qquad (9)$$

In equation (9), the weight parameters f(x) and f(y) are predefined as one look-up-table (LUT) which are determined based on the size and the intra prediction direction of the current CU.

Although the existing OBMC can efficiently reduce the blocking artifacts at motion compensation stage, its performance can be still improved. Especially, in the current design, the overlapping area where the MVs of surrounding blocks are applied to modified the prediction samples of the current CU are fixed. Such design is inappropriate for advanced block partition structure of the VVC/AVS3 where variable block sizes can be achieved through different QT/BT/TT combinations. On the other hand, the current OBMC design also introduces significant complexity to both encoder and decoder design. Especially, such complexity problem may become serious when the OBMC is applied on top of the sub-block-based MC, given that the same OBMC needs to be repeated multiple times (each for one individual sub-block) to modify the prediction signals of all the sub-blocks within one CU. This could not only lead to significant increases of computational complexity and memory bandwidth but also potentially complicate pipeline design and parallel processing at hardware encoder/decoder.

In the present disclosure, methods are proposed to improve the coding efficiency of the OBMC and simplifying the existing OBMC design to facilitate its implementations for hardware codecs. Particularly, to maximize the OBMC's coding gain, special attention is made to better accommodate the OBMC to the current variable block partition structure of the VVC and AVS3 standards. In general, the main aspects of the proposed technologies in the disclosure can be summarized as follows.

To improve the coding efficiency, one adaptive OBMC scheme is proposed. Compared to the existing method where OBMC is fixedly applied on 4-by-4 units, the proposed algorithm adaptively adjusts the region where the OBMC is applied. Additionally, to adapt to varying correlation between neighboring MVs, the weights that are applied to combine the motion compensated predictions of the current CU and its spatial neighbors can also be adaptively changed.

To reduce the worst-case complexity of the OBMC, constraints are proposed to disable the OBMC for the coding modes where multiple hypotheses are needed to generate the prediction samples of the current CU. Firstly, one uni-prediction based OBMC constraint is proposed where the OBMC is only allowed to be applied for the inter blocks are predicted from one single prediction direction (i.e., uni-prediction). Secondly, it is proposed to disable the OBMC for the GPM/AWP and the CIIP/InterPF where additional intra/blending operations are introduced to generate the final prediction samples.

To simplify the computational complexity of the OBMC, it is proposed to only enable the OBMC to the prediction samples on the boundaries between one CU and its casual neighbors (i.e., top and left). For the CUs that are coded in any sub-block modes, the OBMC on its internal sub-block boundaries are always disabled.

Improved OBMC with Variable Applied Area and Adaptive Blending

As discussed above, regardless of different block sizes and coding modes, the overlapping area where the prediction samples of one current CU are blended with that of its spatial neighbors is kept unchanged in the existing OBMC design. However, in modern video coding standards (such VVC and AVS3), variable block-size partition structures are applied to accommodate local statistics/correlations of different videos. Correspondingly, always using fixed size of sample blending may not be optimal in terms of coding efficiency and encoding/decoding complexity for the OBMC scheme. Firstly, choosing large blending size has the drawback that the prediction samples that are generated using neighboring MVs tend to be far away from the corresponding neighboring blocks. Therefore, the correlation between the prediction samples generated using the current MV and neighboring MV may be insufficient. Additionally, large blending area also leads to increased computational complexity given that more prediction samples need to be generated during the OBMC process. On the other hand, large blending size may also be advantageous in the sense that it can yield a more reliable prediction signal in the presence of noise (i.e., the video capture noise and the noise caused by the coding process). Therefore, it is important to select the optimal blending area for different block sizes and coding modes, which is able to maximize the correlation between the multiple predictions generated with various MVs while providing enough resistance to coding noise.

Based on the above consideration, one improved OBMC scheme is proposed in this section. Compared to the existing OBMC, the proposed algorithm has two main differences: 1) the OBMC blending area on each boundary of one CU/sub-block is adaptively adjusted based on the block-size and coding modes of the current CU; 2) the optimal weight factors that are applied to combine multiple OBMC prediction samples are adaptively determined based on the correlation between the prediction samples. Additionally, to avoid complicated 2 dimensional (2-D) blending operation, similar to the existing design, the proposed OBMC is divided into multiple steps with 1-D blending: in the first step, only the MVs of neighboring blocks above the current CU/sub-block are used to be combined with the prediction samples close to the top boundary of the current CU/sub-block; in the second step, only the MVs of neighboring blocks left to the current CU/sub-block are used to be combined with the prediction samples near to the left boundary of the current CU/sub-block; further, when the current CU is coded by one sub-block partition mode (e.g., affine, SbTMVP and MVAP), the third and fourth steps are applied to each sub-block where the MVs of neighboring sub-blocks below and right to the current sub-block are used to modify the prediction samples close to the bottom and right boundaries of the sub-block.

To facilitate the description, in the following, regular inter prediction without sub-block partition is used as, but not limited to, an example to illustrate the proposed algorithm. Specifically, let $P_{obmc}(x, y)$ denotes the blended prediction sample at coordinate (x,y) after combining the prediction signal of the current CU with multiple prediction signal based on the MVs of its spatial neighbors; $P_{cur}(x, y)$ denotes the prediction sample at coordinate (x, y) of the current CU using its corresponding MVs; $P_{top}(x,y)$ and $P_{left}(x, y)$ denote the prediction samples at the same position of the current CU but using the MVs of the left and right neighbors of the CU, respectively.

Figure 11A:
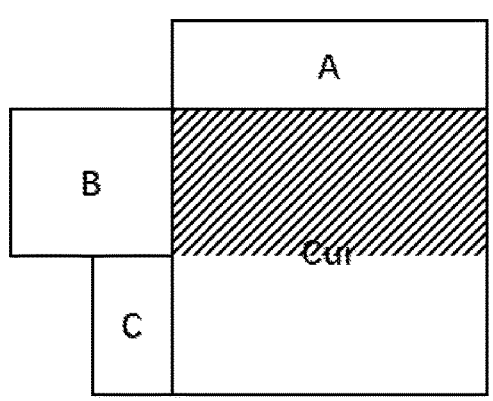
FIG. 11A illustrates schematic diagrams of an OBMC scheme using the MVs of top neighbors in accordance with some implementations of the present disclosure.
Figure 11B:
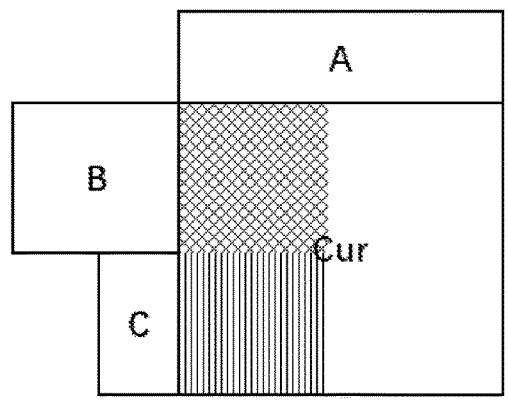
FIG. 11B illustrates schematic diagrams of an OBMC scheme using the MVs of left neighbors in accordance with some implementations of the present disclosure.

Based on the above notations, the boundary prediction samples of the current CU are progressively updated using the MVs of its top and left causal neighbors. As shown in FIGS. 11A-11B, the block A on top of the current block is firstly checked. If block A is one inter block, its MVs will be assigned to the current block to generate the prediction signal $P_{top}$ (x, y) at collocated position of the current block. After that, an amount of rows under the top boundary of the current block (as indicated by the shaded area in FIG. 11A) in $P_{cur}$ and $P_{top}$ are blended to generate the corresponding OBMC prediction signal $P_{obmc}$. The weighting parameters that are applied to combine two prediction signals are calculated from one predefined function $\varphi_K(l)$ where K is the number of rows where the blending is applied and l=0, 1, . . . , K−1. Specifically, after the OBMC is applied, the updated prediction samples on the top boundary of the current block are calculated as $$P_{obmc}(x,y)=\varphi_K(y)\cdot P_{cur}(x,y)+(1-\varphi_K(y))\cdot P_{top}(x,y) \quad (10)$$

Next, by following the same procedures, the proposed scheme proceeds to update the prediction samples on the left boundary of the current block by 1) generating the collocated prediction samples $P_{left}(x, y)$ of the current block using the MVs of left spatial neighbors (i.e., blocks B and C); 2) blending $P_{left}(x, y)$ with the existing prediction signal as in (10) to generate the final OBMC prediction signal as:

$$P_{obmc}(x,y)=\varphi_K(x)\cdot P_{obmc}(x,y)+(1-\varphi_K(x))\cdot P_{left}(x,y) \quad (11)$$

To accommodate varying correlation between the prediction samples generated using the MVs of the current block and its neighboring blocks, different functions $\varphi_K(\cdot)$ may be used to generate the weighting factors for the OBMC blending. In one embodiment of the disclosure, it is proposed to use the following cosine function to formulate the correlation function as $$\varphi_K(l) = \omega^* \cdot \sin\left(\frac{\pi}{2K}\left(l+\frac{1}{2}\right)\right) + (1-\omega^*), l = 0, 1, \ldots, K-1 \quad (12)$$

where $\omega^*$ is the controlling parameter which is used to control the overall range of the weight values that are applied. To persons skilled in modern video coding technologies, other formulation functions (such as raised cosine/sine, exponential function, high-order polynomial function and so forth) can also be applied to generate the weights. In practice, different values of $\omega^*$ may be applied according to the specific characteristics of the coded video. In one embodiment, it is proposed to use one fixed weight value (e.g., 0.5); correspondingly, by such method, there is no need to signal the weight value from encoder to decoder. In another embodiment, it is proposed to determine a set of predefined weight values (e.g., 0.125 and 0.875) and allow it to change from time to time and signal the selected weight value to decoder. In yet another embodiment, it is proposed to give the encoder the freedom to derive arbitrary weight value on-the-fly and signal it in bit-stream. In such case, the values of the allowed weights are fully flexible to choose, i.e., maximizing the encoder flexibility. Meanwhile, when any of the above signaling based scheme is applied, the corresponding weight value may be signaled at various coding levels, e.g., sequence parameter set (SPS), picture parameter set (PPS), picture/slice level or even CTU/CU level.

In FIGS. 11A-11B, half of the total rows/columns of the prediction samples are blended when the vertical/horizontal OBMC is applied. As mentioned above, different blending size can lead to different coding performance/complexity tradeoff for real codec implementations. In one embodiment, it is proposed to use one fixed blending size (e.g., 4 row/columns along the top/left boundaries of one CU/sub-block) for all inter blocks. In another embodiment, it is proposed to adaptive adjust the blending area based on the specific size and partition method of the current CU. For instance, for regular CUs (i.e., the CUs without sub-block partition), it is proposed to determine the blending area based on the size of the CU. Specifically, for the vertical OBMC (i.e., the OBMC from the top neighbors) is enabled, the blending is only applied to M % of the rows of prediction samples close to the CU top boundary; otherwise, when the horizontal OBMC (i.e., the OBMC from left neighbors) is enabled, the blending is only applied to M % of columns of prediction samples close to the CU left boundary. On the other side, when the current CU is coded by one sub-block partition mode (e.g., affine, SbTMVP and MVAP), the corresponding blending size (e.g., M % of rows/columns) is determined based on the corresponding sub-block size rather than the CU size. In one specific example, it is proposed to set M equal to 50, i.e., half of rows/columns are applicable to the OBMC (as shown in FIGS. 11A-11B). In another embodiment, it is proposed to let encoder decide the blending size when the OBMC is applied and signal this value to decoder.

Uni-Prediction Based OBMC

As discussed above, when the OBMC is enabled for one inter CU, multiple motion compensations need to be performed to generate the prediction samples along both CU and sub-block boundaries. The increased motion compensations not only increase the computational complexity due to the additional interpolation operations but also introduce non-negligible increase of memory bandwidth consumption. To resolve the above complexity problem, in this section, one constrained OBMC scheme is proposed where the OBMC is only allowed to be applied for the inter blocks are predicted from one single prediction direction (i.e., uni-prediction). Meanwhile, when one neighboring block that is used to generate the OBMC prediction samples of the current block is bi-predicted, only the MV from one direction is selected. Specifically, if one neighboring block is uni-predicted, the corresponding MV will be directly applied to produce the prediction samples for the OBMC. Otherwise (i.e., the neighboring block is bi-predicted), the inter prediction samples that are used by the OBMC are generated based on the uni-prediction from one prediction list (either L0 or L1). To select the prediction list, different methods may be applied. In the first method, it is proposed to always select the first prediction (i.e., list L0) for any neighboring block that is predicted by two reference pictures. In the second method, it is proposed always select the second prediction (i.e., list L1) for any neighboring block that is predicted by two reference pictures. In the third method, one adaptive method is applied where the prediction list that is associated with one reference picture with smaller picture order count (POC) distance from the current picture is selected. In case the two reference pictures have equal POC distance to the current picture, the one with smaller better quality will be selected. To decide which reference picture has better reconstruction quality, two methods may be applied. In the first method, the QP parameter that is applied to code the corresponding reference picture/block may be used as criterion and the one with small QP will be used for the OBMC. In another method, the layer id may be used as another criterion and the reference picture/block with small layer id in the current prediction structure (e.g., hierarchical B structure) may be selected.

Additionally, as mentioned above, the GPM/AWP mode requires two separate motion compensation and one weight average operation whose computational complexity is already larger than regular bi-prediction. Therefore, it will potential exceed the existing worst-case complexity of inter prediction if the OBMC is further applied to the GPM/AWP mode. Based on such consideration, in one embodiment, it is proposed to disable the OBMC for the CUs that are coded by the GPM/AWP mode.

Similar to GPM/AWP, CIIP/InterPF mode also introduce more than prediction operations to generate the final prediction signal, including one motion compensation (which could be bi-prediction when the current CU is bi-predicted), one intra prediction and one weighted average. Therefore, in order to control the OBMC overall complexity, as one embodiment of the disclosure, it is proposed to disable the OBMC when the current CU is coded by CIIP/InterPF mode.

Disabling the OBMC for the Sub-Block Boundaries

Figure 12:
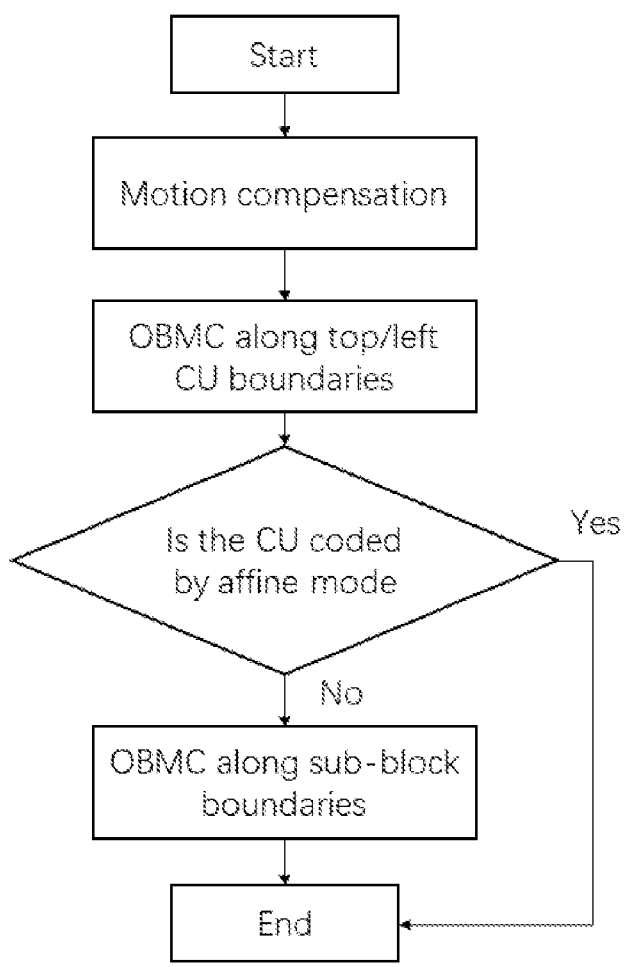
FIG. 12 illustrates a flowchart of an OBMC process when the OBMC is disabled for sub-block boundaries of SbTMVP and MVAP in accordance with some implementations of the present disclosure.

As discussed above, the motivation of the OBMC between the internal boundaries of sub-blocks of one CU (which is coded by one sub-block mode) is to reduce the block artifacts that exists at the sub-block boundaries. This is done by combining multiple prediction signals using the neighboring MVs with the prediction signal of one sub-block. As pointed earlier, this could cause serious complexity problems for practical hardware/software codec designs due to a significant amount of motion compensations that need to be performed for the OBMC. This could not only lead to significant complexity increase but also potentially complicate the pipeline design and parallel processing of both encoder and decoder. On the other hand, the motion parameters of the existing sub-block modes are derived from its spatial/temporal neighboring motion. For instance, the motion field of the SbTMVP is derived from temporal neighbors and the motion field of the affine mode is derived from key spatial neighboring motion based on linear mode. Therefore, this leads to the motion field of most sub-block modes are relatively steady/consistent. This means that the additional performance improvement achieved by the internal OBMC process for sub-block boundaries should be very limited. Based on such analysis, for CUs where sub-block partition is applied (e.g., affine, SbTMVP and MVAP), it is proposed to disable the OBMC for all the prediction samples along the boundaries between different sub-blocks while the OBMC along the CU boundaries are still applied. In another embodiment, it is proposed to enable the OBMC for the sub-block boundaries of affine mode but disable it for the sub-block boundaries of SbTMVP and MVAP modes. In another embodiment, it is proposed to disable the OBMC for the sub-block boundaries of affine mode but enable it for the sub-block boundaries of SbTMVP and MVAP modes. FIG. 12 illustrates a flowchart of an OBMC process when the OBMC is disabled for sub-block boundaries of SbTMVP and MVAP in accordance with some implementations of the present disclosure.

Addressing the Interaction Between OBMC and ASP

As discussed above, the ASP is applied in the current AVS3 standard to further improve the prediction quality of the affine mode, which further applies one filter on top of the prediction samples generated from the default sub-block-based motion compensation of affine mode. In this section, different methods are proposed in the following to handle the interaction when the OBMC and the ASP are applied to affine mode.

Firstly, to achieve the best coding performance, the coder may apply the OBMC and the ASP to one affine CU. Additionally, there could be different application orders when both two coding tools are enabled. In one method, it is proposed to firstly apply the ASP followed by the OBMC to adjust the prediction samples of the sub-block on the CU top and left boundaries. Specifically, by such method, for the sub-blocks along the CU top and left boundaries, the ASP-based sample refinement is firstly applied on top of the existing sub-block-based motion compensated samples. Then, the OBMC is applied by combining the refined prediction samples of the ASP with the prediction samples generated using the motion of the corresponding neighboring blocks. On the other hand, for the sub-blocks inside the CU (i.e., not boundary sub-blocks), only the ASP is applied. In the second method, it is proposed to firstly apply the OBMC followed by the ASP for the sub-blocks along the CU top and left boundaries. More specifically, when this method is applied, the OBMC is firstly applied to modify the prediction samples of the CU boundary sub-blocks based on its spatial neighboring motion. After that, the ASP is further applied to the modified prediction samples output from the OBMC. Similar to the first method, for the sub-blocks inside the CU, only the ASP is applied.

Secondly, to reduce the overall computational complexity, the coder may disable the OBMC for affine mode no matter whether the ASP mode is enabled to one affine CU. In another method, it is proposed to disable the OBMC for affine CUs when the ASP is applied. When the ASP mode is not applied to one CU (e.g., the ASP mode is bypassed by the MV difference criterion as mentioned in "affine secondary prediction"), the OBMC is still applied.

Figure 13:
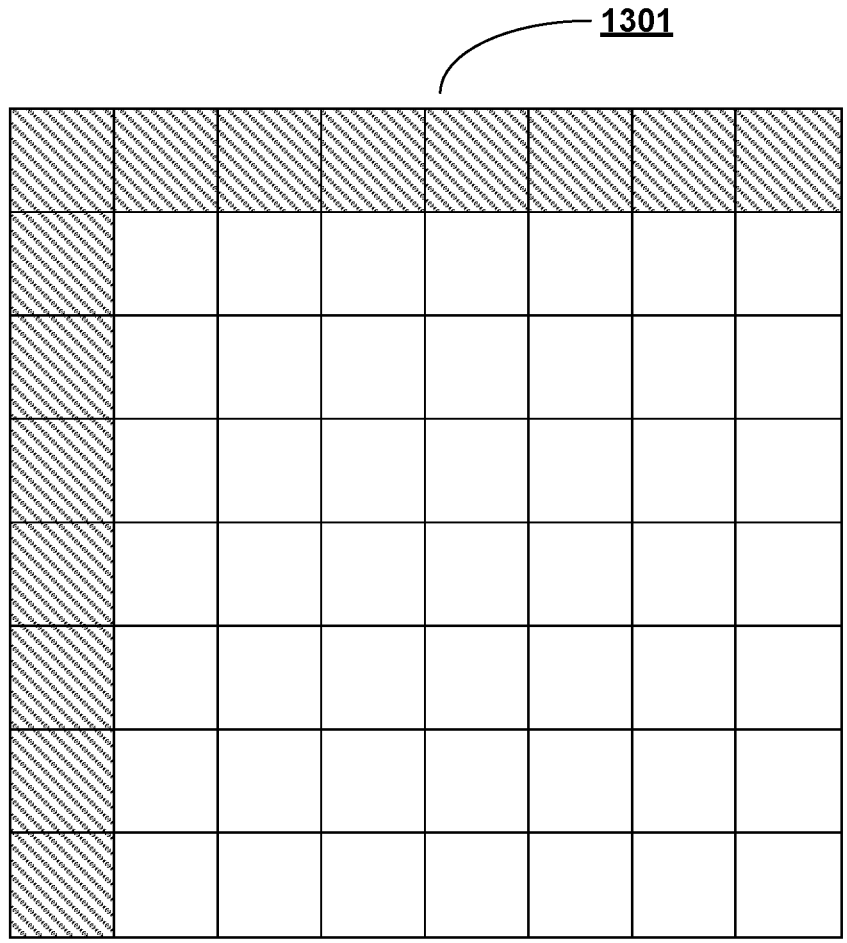
FIG. 13 illustrates joint applying the OBMC and the ASP to one affine CU in accordance with some implementations of the present disclosure.
Figure 13:
Figure 13:
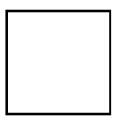

Thirdly, to achieve one better performance/complexity trade-off, the coder may enable OBMC and disable the ASP for the sub-blocks along the CU boundaries. Meanwhile, for the sub-blocks inside the CU, only the ASP is applied. FIG. 13 illustrates joint applying the OBMC and the ASP to one affine CU 1301 in accordance with some implementations of the present disclosure. As shown in FIG. 13, the affine CU 1301 include multiple sub-blocks on the top and left boundaries which are shaded and the OBMC is applied to these shaded sub-blocks. Other than these shaded sub-blocks, the affine CU 1301 include multiple sub-blocks that are not shaded in FIG. 13 and the ASP is applied to these non-shaded sub-blocks.

Figure 14:
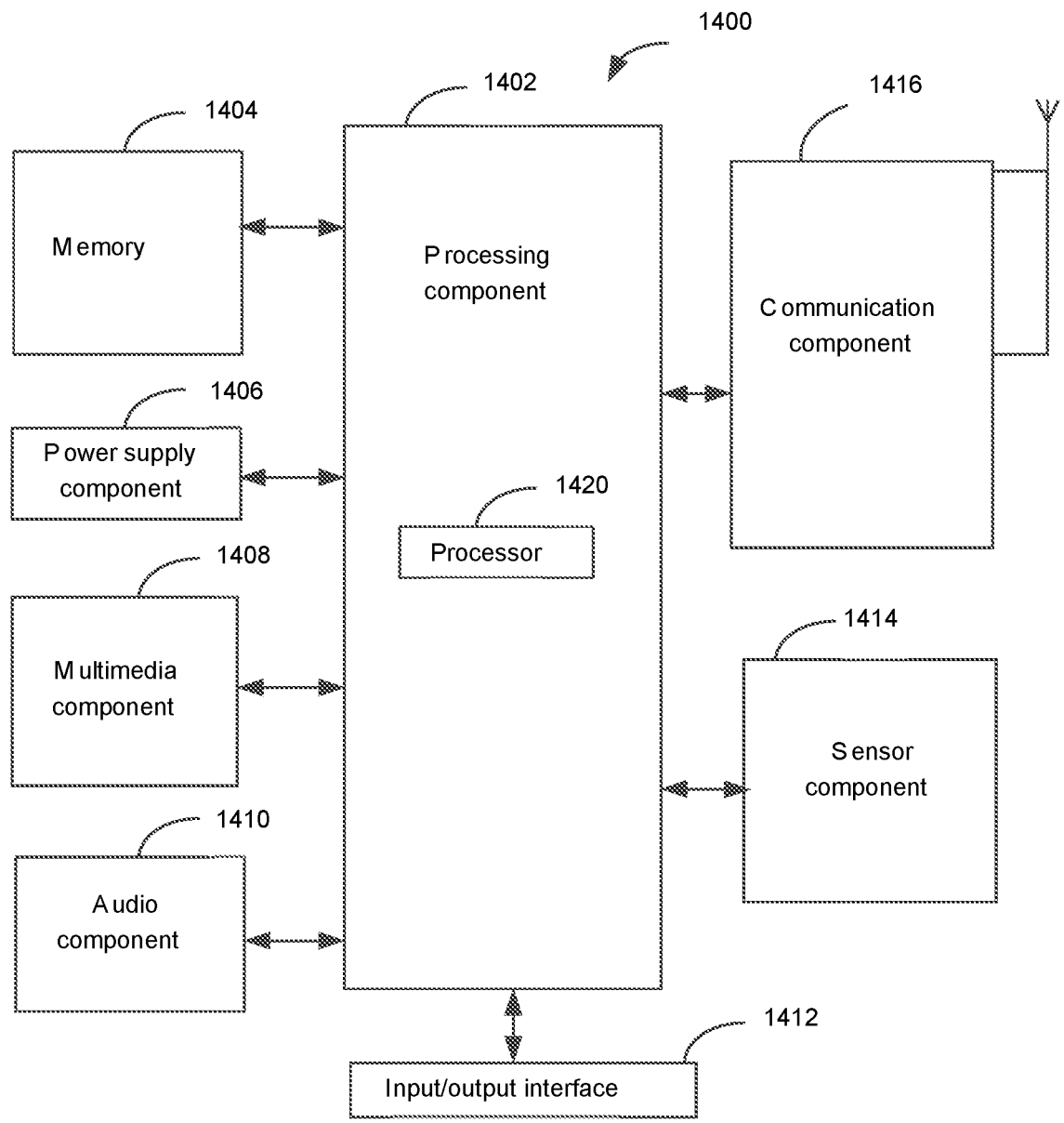
FIG. 14 illustrates a block diagram illustrating an apparatus for video decoding in accordance with some implementations of the present disclosure.

FIG. 14 is a block diagram illustrating an apparatus for video compressed sensing in accordance with some implementations of the present disclosure. The apparatus 1400 may be a terminal, such as a mobile phone, a tablet computer, a digital broadcast terminal, a tablet device, or a personal digital assistant.

As shown in FIG. 14, the apparatus 1400 may include one or more of the following components: a processing component 1402, a memory 1404, a power supply component 1406, a multimedia component 1408, an audio component 1410, an input/output (I/O) interface 1412, a sensor component 1414, and a communication component 1416.

The processing component 1402 usually controls overall operations of the apparatus 1400, such as operations relating to display, a telephone call, data communication, a camera operation, and a recording operation. The processing component 1402 may include one or more processors 1420 for executing instructions to complete all or a part of steps of the above method. Further, the processing component 1402 may include one or more modules to facilitate interaction between the processing component 1402 and other components. For example, the processing component 1402 may include a multimedia module to facilitate the interaction between the multimedia component 1408 and the processing component 1402.

The memory 1404 is configured to store different types of data to support operations of the apparatus 1400. Examples of such data include instructions, contact data, phonebook data, messages, pictures, videos, and so on for any application or method that operates on the apparatus 1400. The memory 1404 may be implemented by any type of volatile or non-volatile storage devices or a combination thereof, and the memory 1404 may be a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk or a compact disk.

The power supply component 1406 supplies power for different components of the apparatus 1400. The power supply component 1406 may include a power supply management system, one or more power supplies, and other components associated with generating, managing and distributing power for the apparatus 1400.

The multimedia component 1408 includes a screen providing an output interface between the apparatus 1400 and a user. In some examples, the screen may include a Liquid Crystal Display (LCD) and a Touch Panel (TP). If the screen includes a touch panel, the screen may be implemented as a touch screen receiving an input signal from a user. The touch panel may include one or more touch sensors for sensing a touch, a slide and a gesture on the touch panel. The touch sensor may not only sense a boundary of a touching or sliding actions, but also detect duration and pressure related to the touching or sliding operation. In some examples, the multimedia component 1408 may include a front camera and/or a rear camera. When the apparatus 1400 is in an operation mode, such as a shooting mode or a video mode, the front camera and/or the rear camera may receive external multimedia data.

The audio component 1410 is configured to output and/or input an audio signal. For example, the audio component 1410 includes a microphone (MIC). When the apparatus 1400 is in an operating mode, such as a call mode, a recording mode and a voice recognition mode, the microphone is configured to receive an external audio signal. The received audio signal may be further stored in the memory 1404 or sent via the communication component 1416. In some examples, the audio component 1410 further includes a speaker for outputting an audio signal.

The I/O interface 1412 provides an interface between the processing component 1402 and a peripheral interface module. The above peripheral interface module may be a keyboard, a click wheel, a button, or the like. These buttons may include but not limited to, a home button, a volume button, a start button, and a lock button.

The sensor component 1414 includes one or more sensors for providing a state assessment in different aspects for the apparatus 1400. For example, the sensor component 1414 may detect an on/off state of the apparatus 1400 and relative locations of components. For example, the components are a display and a keypad of the apparatus 1400. The sensor component 1414 may also detect a position change of the apparatus 1400 or a component of the apparatus 1400, presence or absence of a contact of a user on the apparatus 1400, an orientation or acceleration/deceleration of the apparatus 1400, and a temperature change of apparatus 1400. The sensor component 1414 may include a proximity sensor configured to detect presence of a nearby object without any physical touch. The sensor component 1414 may further include an optical sensor, such as a CMOS or CCD image sensor used in an imaging application. In some examples, the sensor component 1414 may further include an acceleration sensor, a gyroscope sensor, a magnetic sensor, a pressure sensor, or a temperature sensor.

The communication component 1416 is configured to facilitate wired or wireless communication between the apparatus 1400 and other devices. The apparatus 1400 may access a wireless network based on a communication standard, such as WiFi, 4G, or a combination thereof. In an example, the communication component 1416 receives a broadcast signal or broadcast related information from an external broadcast management system via a broadcast channel. In an example, the communication component 1416 may further include a Near Field Communication (NFC) module for promoting short-range communication. For example, the NFC module may be implemented based on Radio Frequency Identification (RFID) technology, infrared data association (IrDA) technology, Ultra-Wide Band (UWB) technology, Bluetooth (BT) technology and other technology.

In an example, the apparatus 1400 may be implemented by one or more of Application Specific Integrated Circuits (ASIC), Digital Signal Processors (DSP), Digital Signal Processing Devices (DSPD), Programmable Logic Devices (PLD), Field Programmable Gate Arrays (FPGA), controllers, microcontrollers, microprocessors, or other electronic elements to perform the above method. A non-transitory computer readable storage medium may be, for example, a Hard Disk Drive (HDD), a Solid-State Drive (SSD), Flash memory, a Hybrid Drive or Solid-State Hybrid Drive (SSHD), a Read-Only Memory (ROM), a Compact Disc Read-Only Memory (CD-ROM), a magnetic tape, a floppy disk, etc.

FIG. 15 illustrates a flowchart illustrating a process for video decoding in accordance with some implementations of the present disclosure. In step 1501, the one or more processors 1420 obtains a plurality of sub-blocks within an affine CU of a video frame, where the plurality of sub-blocks include a plurality of boundary sub-blocks and a plurality of non-boundary sub-blocks.

In some examples, the plurality of boundary sub-blocks includes a plurality of top left boundary sub-blocks located on top and left boundaries of the affine CU as shown in FIG. 8 and FIG. 13. For example, in FIG. 8, sub-blocks $B_1$-$B_7$ are the top left boundary sub-blocks of a current CU. In FIG. 13, the shaded sub-blocks are the top left boundary sub-blocks of the affine CU 1301.

In step 1502, the one or more processors 1420 applies both OBMC and ASP to at least one sub-block to generate a sub-block-based prediction for the affine CU.

In some examples, the one or more processors 1420 may apply the ASP followed by the OBMC on the plurality of top left boundary sub-blocks to adjust prediction samples of the plurality of top left boundary sub-blocks. For example, the one or more processors 1420 may apply the ASP on the plurality of top left boundary sub-blocks to obtain refined prediction samples corresponding to the plurality of top left boundary sub-blocks, and then apply the OBMC on the refined prediction samples by combining the refined prediction samples and prediction samples generated based on motion of neighboring blocks of the affine CU.

In some examples, the one or more processors 1420 may apply the OBMC followed by the ASP on the plurality of top left boundary sub-blocks to adjust prediction samples of the plurality of top left boundary sub-blocks. For example, the one or more processors 1420 may apply the OBMC on the plurality of top left boundary sub-blocks to modify the prediction samples of the plurality of top left boundary sub-blocks based the motion of neighboring blocks of the affine CU, and then apply the ASP to the top left boundary sub-blocks to refine the prediction samples of the top left boundary sub-blocks that are modified.

In some examples, the one or more processors 1420 may applying the ASP to the plurality of non-boundary sub-blocks.

FIG. 16 illustrates a flowchart illustrating a process for video decoding in accordance with some implementations of the present disclosure. In step 1601, the one or more processors 1420 obtains a plurality of sub-blocks within an affine CU of a video frame, where the plurality of sub-blocks include a plurality of boundary sub-blocks and a plurality of non-boundary sub-blocks.

In step 1602, the one or more processors 1420 enabling ASP for the plurality of non-boundary sub-blocks and disabling overlapped block motion compensation OBMC for the plurality of non-boundary sub-blocks.

In some examples, the plurality of boundary sub-blocks may include sub-blocks at all boundaries of the affine CU. For example, in FIG. 13, the shaded sub-blocks are boundary sub-blocks located on the top and left boundaries of the affine CU.

In some examples, the plurality of non-boundary sub-blocks may include sub-blocks that are not located on one or more boundaries of the affine CU. For example, in FIG. 13, the un-shaded sub-blocks are non-boundary sub-blocks.

In some examples, the one or more processors 1420 may enable the OBMC for the plurality of boundary sub-blocks and disabling the ASP for the plurality of boundary sub-blocks.

In some examples, the one or more processors 1420 may disable the OBMC for the plurality of boundary sub-blocks.

In some examples, the one or more processors 1420 may disable the OBMC for the sub-block in response to determining that the ASP is applied for a sub-block.

In some examples, the one or more processors 1420 may enable the OBMC for the sub-block in response to determining that the ASP is not applied for a sub-block.

In some other examples, there is provided a non-transitory computer readable storage medium 1404, having instructions stored therein. When the instructions are executed by one or more processors 1420, the instructions cause the processor to perform any method as described in FIGS. 15-16 and above.

The description of the present disclosure has been presented for purposes of illustration and is not intended to be exhaustive or limited to the present disclosure. Many modifications, variations, and alternative implementations will be apparent to those of ordinary skill in the art having the benefit of the teachings presented in the foregoing descriptions and the associated drawings.

The examples were chosen and described in order to explain the principles of the disclosure, and to enable others skilled in the art to understand the disclosure for various implementations and to best utilize the underlying principles and various implementations with various modifications as are suited to the particular use contemplated. Therefore, it is to be understood that the scope of the disclosure is not to be limited to the specific examples of the implementations disclosed and that modifications and other implementations are intended to be included within the scope of the present disclosure.

What is claimed is:

1. A method for video decoding, comprising:
   obtaining a plurality of sub-blocks within an affine coding unit (CU) of a video frame, wherein the plurality of sub-blocks comprise a plurality of boundary sub-blocks and a plurality of non-boundary sub-blocks; and
   enabling affine secondary prediction (ASP) for the plurality of non-boundary sub-blocks and disabling overlapped block motion compensation (OBMC) for the plurality of non-boundary sub-blocks.

2. The method of claim 1, further comprising:
   enabling the OBMC for the plurality of boundary sub-blocks and disabling the ASP for the plurality of boundary sub-blocks.

3. The method of claim 1, further comprising:
   disabling the OBMC for the plurality of boundary sub-blocks.

4. The method of claim 1, wherein when the ASP is enabled for a sub-block, the OBMC is disabled for the sub-block.

5. The method of claim 1, further comprising:
   in response to determining that the ASP is not applied for a sub-block, enabling the OBMC for the sub-block.

6. The method of claim 1, wherein each of the plurality of sub-blocks has a block size of 8×8 or 4×4.

7. An apparatus for video decoding, comprising:
   one or more processors; and
   a memory configured to store instructions executable by the one or more processors,
   wherein the one or more processors, upon execution of the instructions, are configured to perform operations comprising:
   obtaining a plurality of sub-blocks within an affine coding unit (CU) of a video frame, wherein the plurality of sub-blocks comprise a plurality of boundary sub-blocks and a plurality of non-boundary sub-blocks; and
   enabling affine secondary prediction (ASP) for the plurality of non-boundary sub-blocks and disabling overlapped block motion compensation (OBMC) for the plurality of non-boundary sub-blocks.

8. The apparatus of claim 7, wherein the one or more processors are further configured to perform:
   enabling the OBMC for the plurality of boundary sub-blocks and disabling the ASP for the plurality of boundary sub-blocks.

9. The apparatus of claim 7, wherein the one or more processors are further configured to perform:
   disabling the OBMC for the plurality of boundary sub-blocks.

10. The apparatus of claim 7, wherein when the ASP is enabled for a sub-block, the OBMC is disabled for the sub-block.

11. The apparatus of claim 7, wherein the one or more processors are further configured to perform:
    in response to determining that the ASP is not applied for a sub-block, enabling the OBMC for the sub-block.

12. The apparatus of claim 7, wherein each of the plurality of sub-blocks has a block size of 8×8 or 4×4.

13. A non-transitory computer readable storage medium storing computer-executable instructions that, when executed by one or more computer processors, causes the one or more computer processors to perform a method comprising:
    obtaining a plurality of sub-blocks within an affine coding unit (CU) of a video frame, wherein the plurality of sub-blocks comprise a plurality of boundary sub-blocks and a plurality of non-boundary sub-blocks; and
    enabling affine secondary prediction (ASP) for the plurality of non-boundary sub-blocks and disabling overlapped block motion compensation (OBMC) for the plurality of non-boundary sub-blocks.

14. The non-transitory computer readable storage medium of claim 13, wherein the method further comprises:
    enabling the OBMC for the plurality of boundary sub-blocks and disabling the ASP for the plurality of boundary sub-blocks.

15. The non-transitory computer readable storage medium of claim 13, wherein the method further comprises:
    disabling the OBMC for the plurality of boundary sub-blocks.

16. The non-transitory computer readable storage medium of claim 13, wherein when the ASP is enabled for a sub-block, the OBMC is disabled for the sub-block.

17. The non-transitory computer readable storage medium of claim 13, wherein the method further comprises:

in response to determining that the ASP is not applied for a sub-block, enabling the OBMC for the sub-block.

18. The non-transitory computer readable storage medium of claim 13, wherein each of the plurality of sub-blocks has a block size of 8×8 or 4×4.

* * * * *